(12) United States Patent
Hollowell (10) Patent No.: US 10,625,987 B1
(45) Date of Patent: Apr. 21, 2020

(54) ENGINE PICK END EFFECTORS AND METHODS OF RAISING AND LOWERING VEHICLE ENGINES USING ENGINE PICK END EFFECTORS

(71) Applicant: Toyota Motor Engineering & Manufacturing North America, Inc., Plano, TX (US)

(72) Inventor: Mary C. Hollowell, Marion, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 16/394,497

(22) Filed: Apr. 25, 2019

(51) Int. Cl.
*B66C 1/36* (2006.01)
*F16B 45/04* (2006.01)
*B66C 1/10* (2006.01)

(52) U.S. Cl.
CPC ............. *B66C 1/36* (2013.01); *B66C 1/107* (2013.01); *F16B 45/04* (2013.01)

(58) Field of Classification Search
CPC .. B66C 1/107; B66C 1/36; B66C 1/62; B66C 1/40; F16B 45/04
USPC .......... 294/82.23, 81.56, 67.1, 67.3
See application file for complete search history.

(56) References Cited

U.S. PATENT DOCUMENTS

| | | | | |
|---|---|---|---|---|
| 1,444,311 A * | 2/1923 | Kasch | ............ | F16B 45/04 24/600.5 |
| 1,729,188 A * | 9/1929 | Schillinger | ............ | E21B 19/04 294/82.23 |
| 2,084,722 A * | 6/1937 | Baker | ............ | B66C 1/36 294/82.23 |
| 2,404,830 A * | 7/1946 | Dempster | ............ | B66C 1/34 294/82.23 |
| 2,577,790 A * | 12/1951 | McCormick | ............ | B66C 1/36 24/600.8 |
| 2,872,717 A * | 2/1959 | Kelley | ............ | B66C 1/36 294/82.19 |
| 2,986,421 A * | 5/1961 | Grove | ............ | B66C 1/34 294/82.3 |
| 3,218,100 A | 11/1965 | Bendi | | |
| 3,482,817 A * | 12/1969 | Ross | ............ | B66C 1/107 254/133 R |
| 3,859,693 A * | 1/1975 | Breed | ............ | B63B 21/04 24/600.7 |
| 4,102,295 A * | 7/1978 | Crook, Jr. | ............ | B66C 1/40 116/281 |
| 4,401,334 A | 8/1983 | Kraeling | | |
| 5,267,765 A | 12/1993 | Diethelm et al. | | |
| 5,671,960 A * | 9/1997 | Chyz | ............ | B66C 1/107 294/67.5 |
| 2012/0161456 A1 | 6/2012 | Riedmayr et al. | | |
| 2014/0306472 A1* | 10/2014 | Manickam | ............ | B66C 1/107 294/81.5 |

FOREIGN PATENT DOCUMENTS

CN 106829731 B1 5/2018
JP 200007272 A 1/2000

* cited by examiner

*Primary Examiner* — Dean J Kramer
(74) *Attorney, Agent, or Firm* — Dinsmore & Shohl LLP (57) ABSTRACT

An end effector includes a body having a cavity located therein. The body partially encloses the cavity and includes an opening through the body to the cavity that is sized to receive a hanger hook. A hooking structure is located within the cavity. A latch is movably received by the body. The latch has a closed position that reduces the size of the opening and an open position that increases the size of the opening.

16 Claims, 7 Drawing Sheets

ENGINE PICK END EFFECTORS AND METHODS OF RAISING AND LOWERING VEHICLE ENGINES USING ENGINE PICK END EFFECTORS

TECHNICAL FIELD

The present specification generally relates to engine pick end effectors and associated methods, and more specifically, engine pick end effectors with internal hook.

BACKGROUND

End effectors are frequently used to hook chains and parts together for a lifting operation. One such lifting operation is lifting engines from one assembly process to the next, and the installation and removal of vehicle engines from engine compartments of vehicles. Some end effectors may have false lifting points, which can lead to unintended unlatching and unsuccessful lifting operations. Accordingly, a need exists for engine pick end effectors that include an internal hooking structure that can inhibit unintended unlatching. The end effectors may be utilized below a hoist chain and can inhibit unintended unlatching should slack occur in the hoist chain.

SUMMARY

In one embodiment, an end effector includes a body having a cavity located therein. The body partially encloses the cavity and includes an opening through the body to the cavity that is sized to receive a hanger hook. A hooking structure is located within the cavity. A latch is movably received by the body. The latch having a closed position that reduces the size of the opening and an open position that increases the size of the opening.

In another embodiment, a method of lifting an object that is in excess of about 300 lbs. using an end effector is provided. The method includes inserting a hanger hook through an opening of a body of the end effector with a latch of the end effector in an open position and into a cavity within the body. The hanger hook is engaged with a hooking structure that is located within the cavity. A size of the opening is reduced using the latch.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to engine pick end effectors that include an internal hook that mates with a cooperating engine hanger hook for connecting a vehicle engine to a lifting device, such as a lift crane. The engine pick end effectors include a body that includes a pair of side panels and a central panel that is sandwiched between the side panels. The side panels and the central panel together define a cavity located within the body of the engine pick end effectors that is sized to receive the engine hanger hook therein. The central panel further includes a hook member that is located within the cavity and sandwiched between the side panels. The cavity is sized and shaped to constrain movement, such as rotation of the engine hanger hook relative to the engine pick end effector with the engine hanger hook engaged with the hook member of the engine pick end effector. The engine pick end effector also includes a latch that is slidable relative to side and central panels to further constrain movement of the engine hanger hook out of the cavity.

Figure 1:
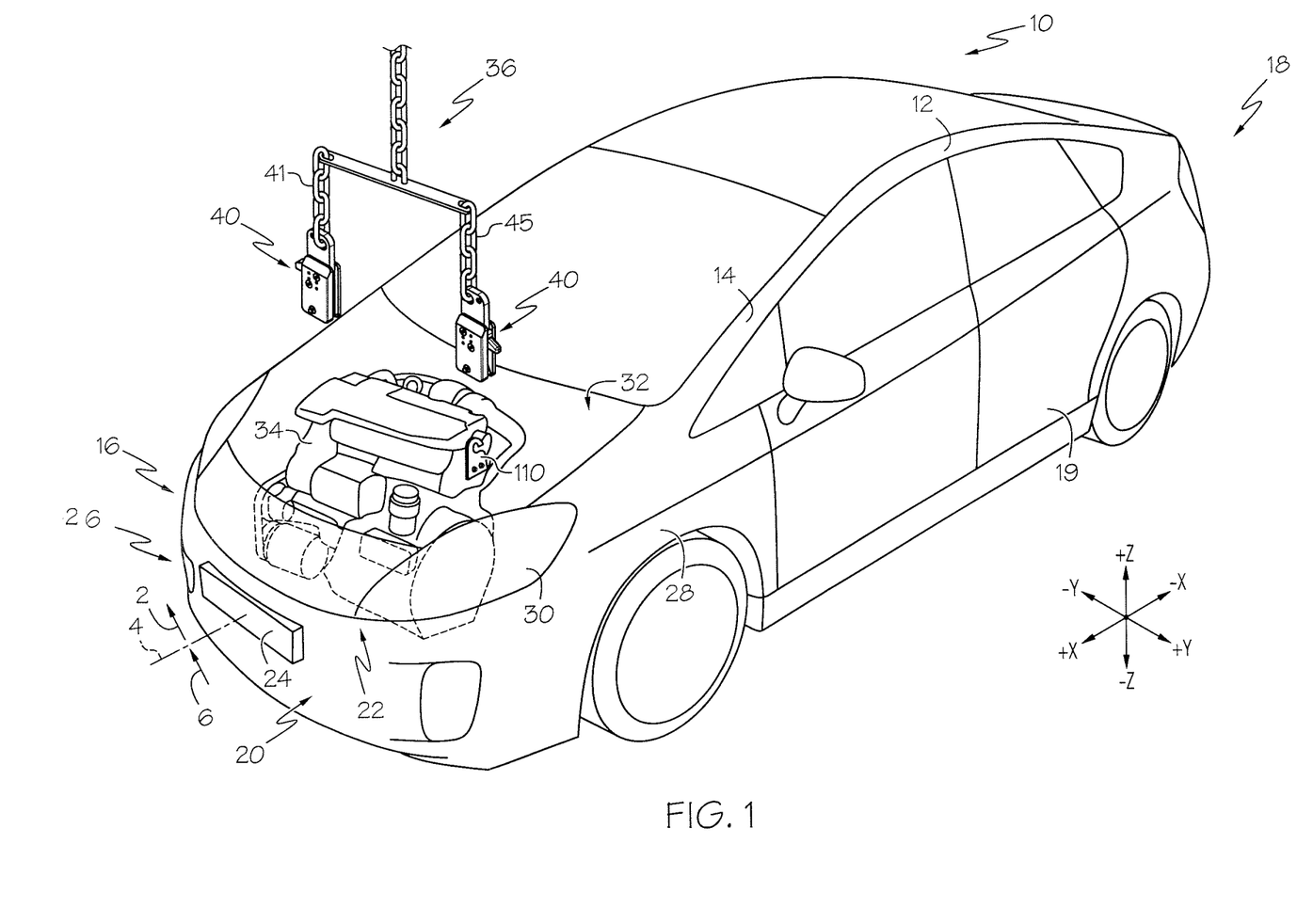
FIG. 1 is a diagrammatic perspective view of a process of carrying a vehicle engine using an end effector, according to one or more embodiments shown and described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 includes a vehicle body 12 including a body framework 14 and having a front 16, a rear 18 and sides 19 that extend between the front 16 and the rear 18. The vehicle 10 includes a front end assembly 20 at the front 16 of the vehicle body. The front end assembly 20 includes an upper bumper cover portion 22 that extends in a vehicle-lateral direction of the vehicle 10. The front end assembly 20 may further include a grille assembly 24. The vehicle 10 may also include front fenders 28 disposed at opposite sides of the grille assembly 24 with headlamp assemblies 30. A hood may be located above the upper grille assembly 26 that provides a cover for an engine compartment 32.

In FIG. 1, an engine 34 is shown placed into the engine compartment 32 by a lift crane, represented by element 36. Engine pick end effectors 40 are illustrated that connect chains 41 and 45 to hanger hooks 110 (only one can be seen) that are bolted directly to opposite sides of the engine 34. As will be described in greater detail below, the engine pick end effectors 40 releasably connect the lift crane 36 to the hanger hooks 110 in a reliable fashion. While chains are illustrated, any suitable connection may be used, such as cables. Further, while engines are described herein, the end effectors 40 may be suitable for use in lifting, lowering and otherwise supporting other, relatively heavy equipment (e.g., greater than about 300 lbs., such as greater than about 500 lbs.).

Figure 2:
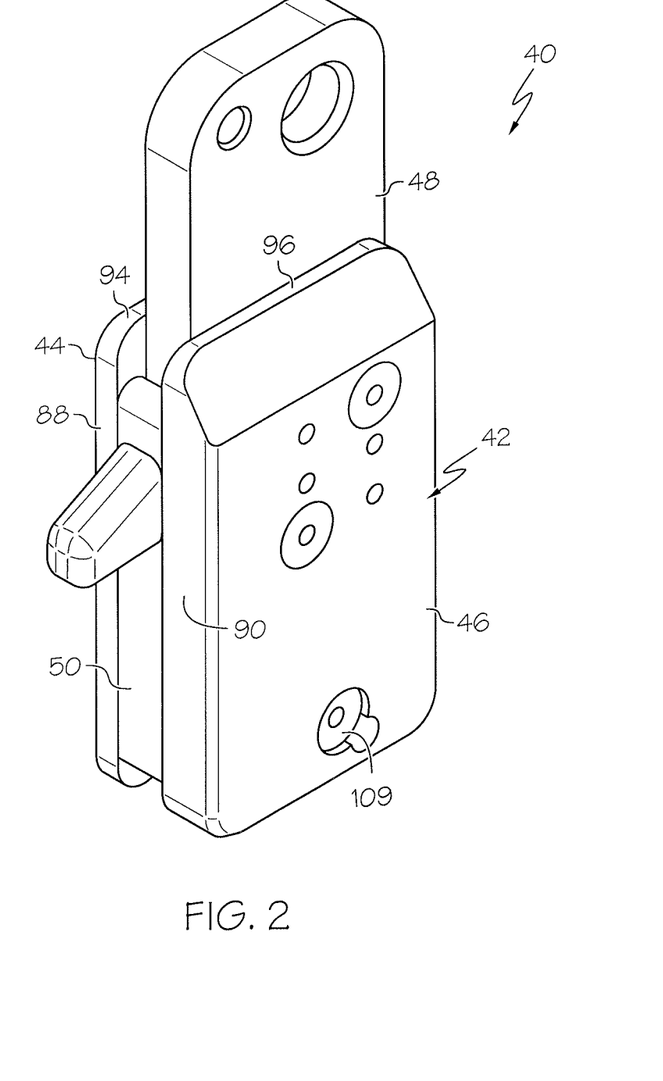
FIG. 2 is a perspective view of the end effector of FIG. 1, according to one or more embodiments shown and described herein.

Referring to FIG. 2, the engine pick end effector 40 is shown in isolation and includes a body 42 that includes a pair of side panels 44 and 46 and a central panel 48 that is sandwiched between the side panels 44 and 46. A latch 50 is slidably attached to the body 42 and located between the side panels 44 and 46. As will be described in greater detail below, the latch 50 has a closed configuration that inhibits removal of an engine hanger hook from the engine pick end effector 40 and an open configuration that allows removal of the engine hanger hook from the engine pick end effector 40.

Figure 3:
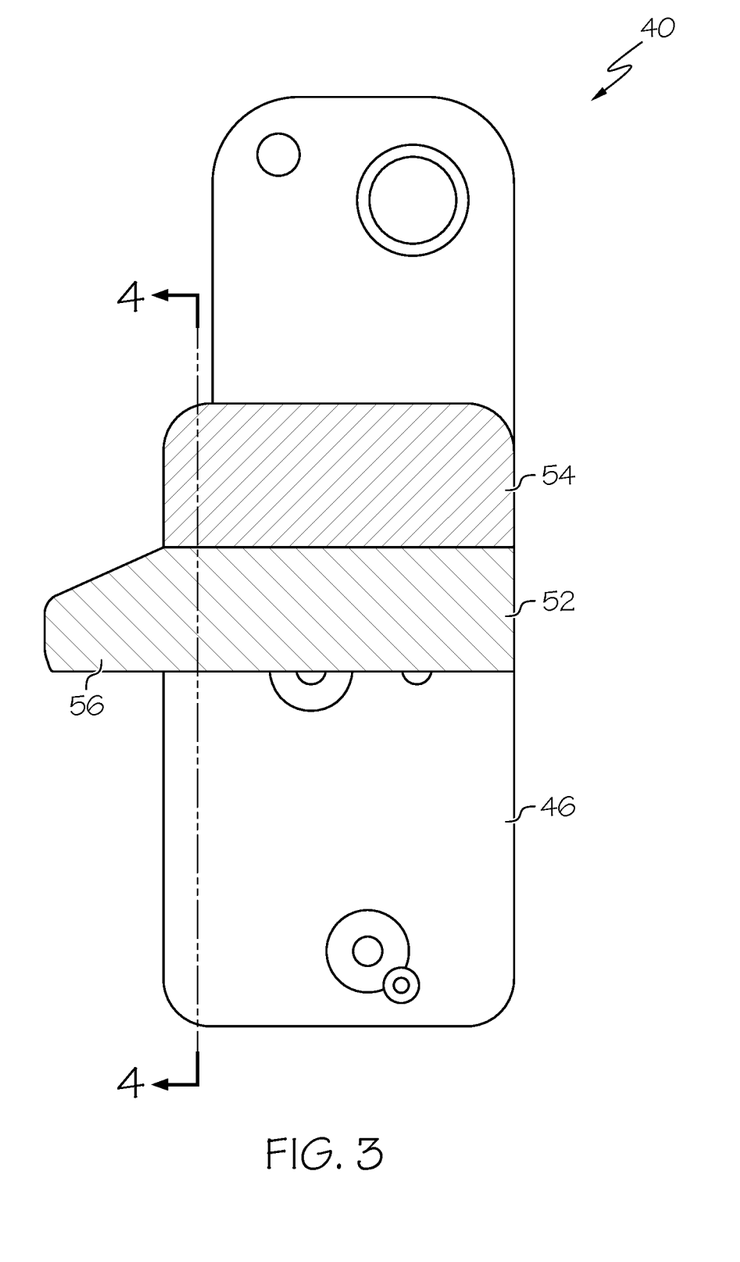
FIG. 3 is a side view of the end effector of FIG. 2, according to one or more embodiments shown and described herein.

Referring to FIG. 3, a side of the engine pick end effector 40 is shown and can include indicia to aid a user when using the engine pick end effector 40. In this example, the side panel 46 has a first region 52 that is painted green, or other suitable color, as represented by hatching, and a second region 54 adjacent the first region 52 that is painted red, or other suitable color, as represented by hatching. The other side panel 44 may include the same indicia. The remaining surface area of the body 42 may be painted any other suitable color, such as orange. A latch handle 56 may also be painted green, or some other suitable color. If the latch handle 56 is aligned with first region 52, the indicia provides an indication that the latch 50 is in the lower, closed position and if the latch handle 56 is aligned with second region 54, the indicia provides an indication that the latch 50 is in the elevated, open position.

Figure 4:
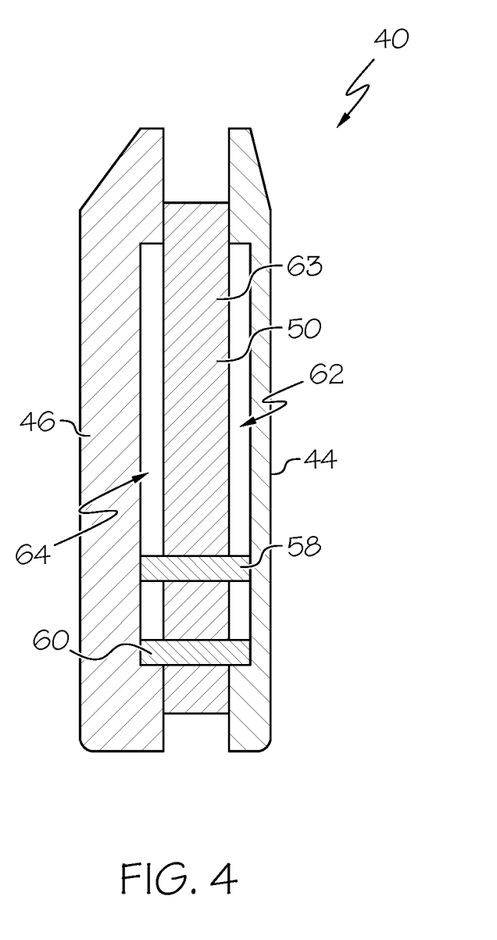
FIG. 4 is a section view of the end effector along line 4-4 of FIG. 3, according to one or more embodiments shown and described herein.

FIG. 4 is a section view of the engine pick end effector 40 along line 4-4 of FIG. 3 and illustrates the latch 50 between the side panels 44 and 46. A pair of pins 58 and 60 pass through a leg 63 of the latch 50 that is connected to the latch handle 56 (FIG. 3). The pins 58 and 60 are slidably received within slots 62 and 64 provided in the side panels 44 and 46. The slots 62 and 64 and pins 58 and 60 allow the latch 50 to freely slide between the open and closed positions.

Figure 5:
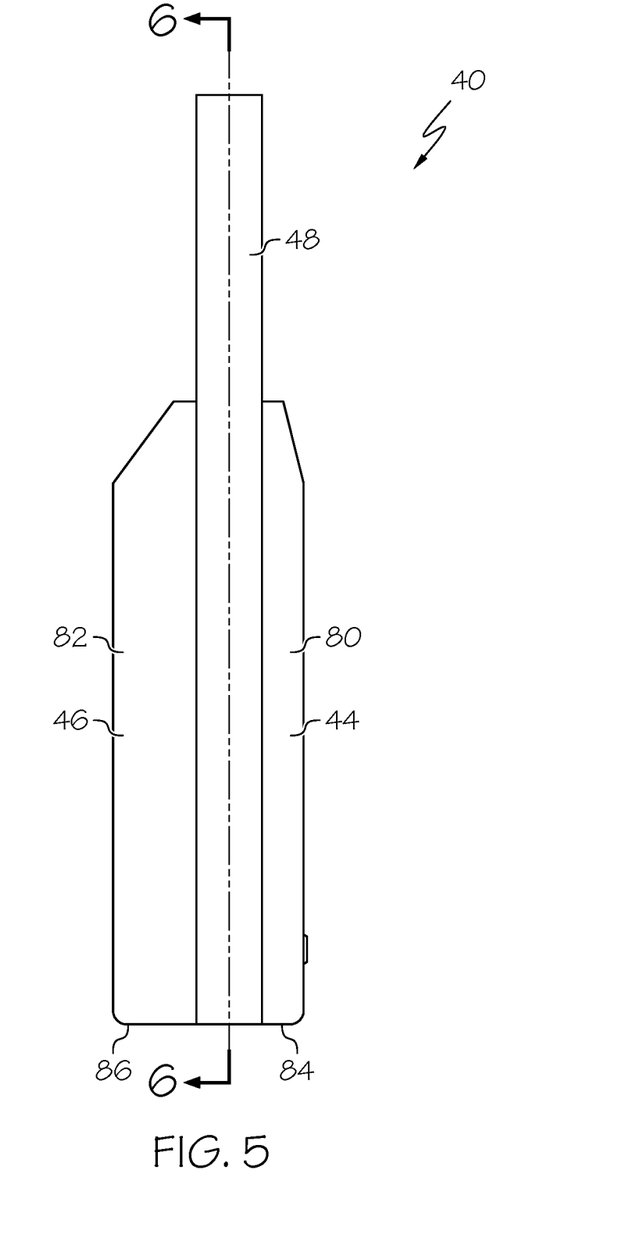
FIG. 5 is a rear view of the end effector of FIG. 2, according to one or more embodiments shown and described herein.
Figure 6:
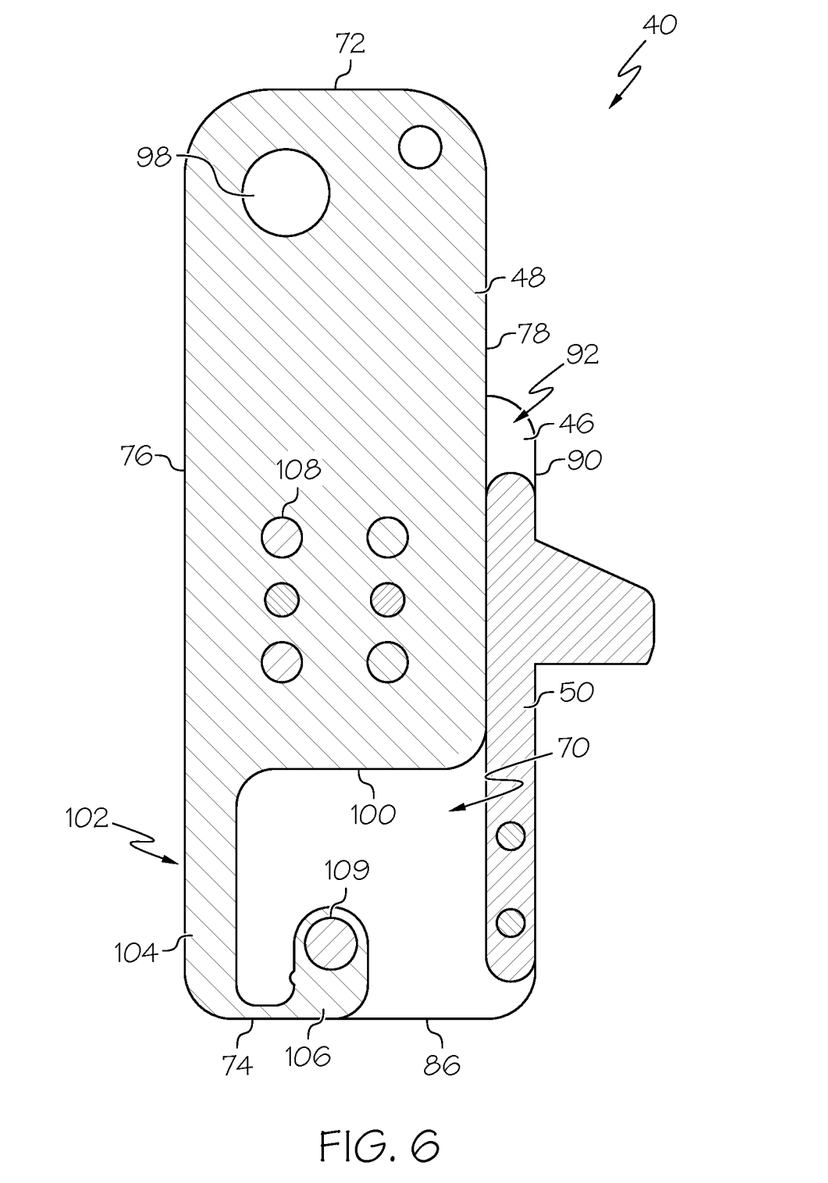
FIG. 6 is a section view of the end effector along line 6-6 of FIG. 5, according to one or more embodiments shown and described herein.

FIG. 5 shows a rear view of the engine pick end effector 40 including the pair of side panels 44 and 46 and the central panel 48 that is sandwiched between the side panels 44 and 46. FIG. 6 is a side section view through the central panel 48 to illustrate a cavity 70 that is formed between the side panels 44 and 46. The central panel includes a top edge 72, a bottom edge 74 and side edges 76 and 78. As can be seen, the top edge 72 is located above the side panels 44 and 46, the side edge 76 is aligned with side edges 80 and 82 side panels 44 and 46 (FIG. 5), the bottom edge 74 is aligned with bottom edges 84 and 86 of the side panels 44 and 46, and the side edge 78 is recessed from side edges 88 and 90 of the side panels 44 and 46 (FIG. 2) to provide a pathway 92 for the latch 50 to travel between the open and closed positions. In this way, the central panel 48 may be completely constrained between the side panels 44 and 46 on the sides and bottom of the engine pick end effector 40. The central panel 48 extends beyond top edges 94 and 96 of the side panels 44 and 46 (FIG. 2) and includes an opening 98 that receives a mating connection for hanging the engine pick end effector 40.

Referring still to FIG. 6, the central panel 48 includes an overhang edge 100 that overhangs the cavity 70 and extends from the latch 50 rearward to an internal hooking structure 102. The internal hooking structure 102 includes a stem portion 104 that extends outwardly from the overhang edge 100 and a hook portion 106 that curves back toward the overhang edge 100. Pins 108 used to pin the side panels 44 and 46 to the central panel 48. A bolt 109 passes through the internal hooking structure 102 and provides support for an engine hanger hook. The hooking structure 102 impedes movement of the engine hanger hook when connected therewith.

Figure 7:
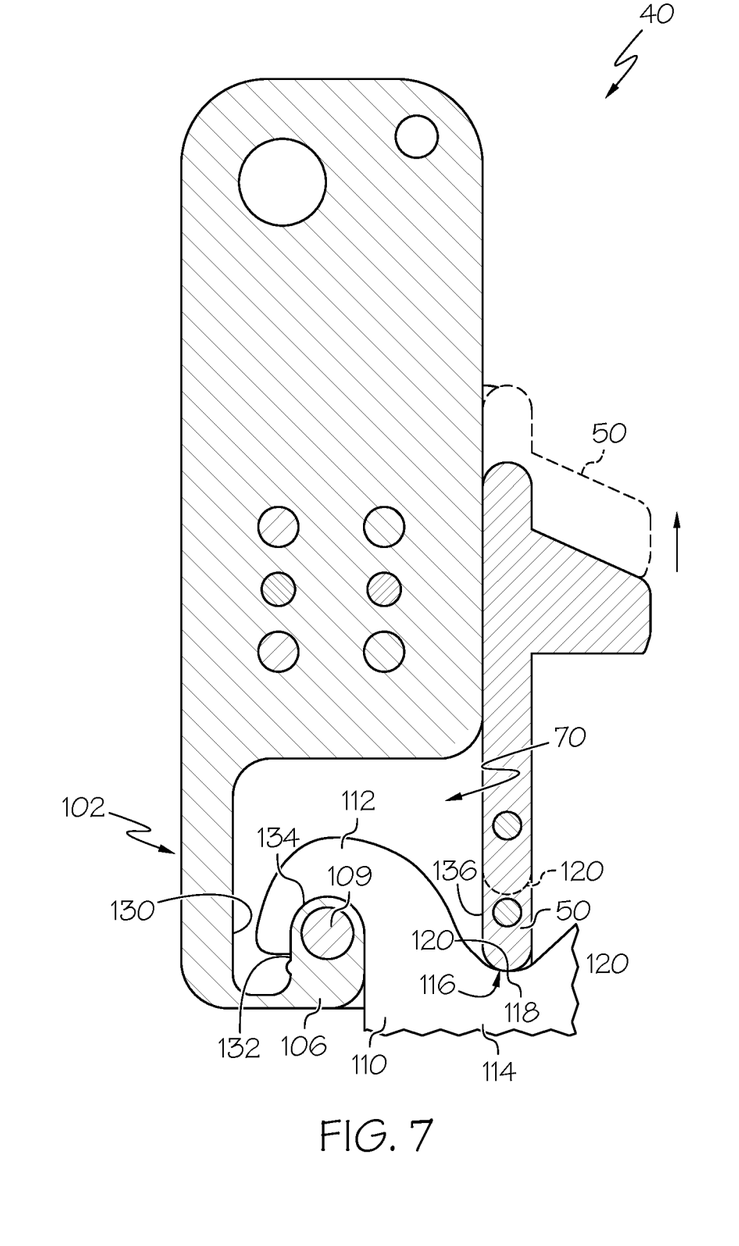
FIG. 7 is another section view of the end effector along lines 6-6 of FIG. 5, according to one or more embodiments shown and described herein.

Referring to FIG. 7, the cavity 70 is sized to receive an engine hanger hook 110. The engine hanger hook 110 includes a hook portion 112 that is sized to engage the hook portion 106 of hooking structure 102 including the bolt 109. The bolt 109 is the primary support for weight of the engine. The engine hanger hook 110 further includes a stem portion 114 that includes a recess 116 between the stem portion 114 and the hook portion 112. The recess 116 provides an engagement surface 118 that can be engaged by an end 120 of the latch 50 for inhibiting movement of the engine hanger hook 110 out of the cavity 70. Further, the side panels 44 and 46 may be spaced-apart only slightly wider than a thickness of the engine hanger hook 110 to inhibit rotation of the engine hanger hook 110 relative to the engine pick end effector 40. The latch 50 may be lifted to the open position (represented by dashed lines) to allow for removal of the engine hanger hook 110 from the cavity 70. In particular, the latch 50 may be raised to increase a size of an opening 122 to the cavity 70 to allow for removal of the engine hanger hook 110. In some embodiments, the latch may be biased toward the closed position, for example, by gravity when in use.

Depending on the size and shape of the engine hanger hook 110, multiple surfaces of the engine pick end effector 40 can inhibit rotation of the engine hanger hook 110 during use. For example, surfaces 130 and 132 can inhibit counterclockwise rotation of the engine hanger hook 40. Surfaces 134 and 136 can inhibit clockwise rotation of the engine hanger hook 110. The surfaces 130, 132, 134 and 136 can be arranged to allow for some rotation of the engine hanger hook 110 so that the system can sway and reduce binding or jamming, but also restrict excessive motion that can cause unintended unlatching.

The above-described engine pick end effectors allow for engagement with an engine hanger hook, while inhibiting unintended twisting of the engine hanger hook relative to the engine pick end effectors and unintended removal of the engine hanger hook from the engine pick end effectors. A latch is provided that can also inhibit unintended removal of the engine hanger hooks from the engine pick end effectors in a closed position. Indicia can be provided that provides an indication of whether the latch is in the open or closed configuration. All corners of the engine pick end effectors may be chamfered, all bolts recessed and all pockets removed in order to remove false lifting locations. The bodies of the engine pick end effectors including the side plates and central plates may be formed of any suitable material, such as an alloy steel.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An end effector comprising:
    a body having a cavity located therein, the body partially enclosing the cavity and including an opening through the body to the cavity that is sized to receive a hanger hook;
    a hooking structure is located within the cavity; and
    a latch is movably received by the body, the latch has a closed position that reduces the size of the opening and an open position that increases the size of the opening;
    wherein the body comprises a pair of side panels and a central panel located between the side panels, the central panel comprising the hooking structure and an overhang edge that overhangs the cavity and extends from the latch to the hooking structure.

2. The end effector of claim 1, wherein the hooking structure comprising a bolt that extends between the side panels.

3. The end effector of claim 2, wherein the hooking structure comprises a stem portion that extends outwardly from the overhang edge to a hook portion that curves toward the overhang edge.

4. The end effector of claim 3, wherein the bolt extends through the hook portion.

5. The end effector of claim 4, wherein the hook portion is a monolithic part of the central panel.

6. The end effector of claim 4 comprising a pin that extends through the side panels and the central panel.

7. The end effector of claim 1, wherein the latch includes a latch handle that extends outward from the body.

8. The end effector of claim 7, wherein the body has a first region of a first color and a second region of a second color, wherein the first region and the second region provide an indication of whether the latch is in the closed position or the open position when the latch handle is aligned with the first region or the second region.

9. A method of lifting an object that is in excess of about 300 lbs. using an end effector, the method comprising:
    inserting a hanger hook through an opening of a body of the end effector with a latch of the end effector in an open position and into a cavity within the body;
    engaging the hanger hook with a hooking structure that is located within the cavity; and
    reducing a size of the opening using the latch;
    wherein the body comprises a pair of side panels and a central panel located between the side panels, the central panel comprising the hooking structure and an overhang edge that overhangs the cavity and extends from the latch to the hooking structure.

10. The method of claim 9, wherein the object is a vehicle engine.

11. The method of claim 9, wherein the hooking structure comprising a bolt that extends between the side panels.

12. The method of claim 11, wherein the hooking structure comprises a stem portion that extends outwardly from the overhang edge to a hook portion that curves toward the overhang edge.

13. The method of claim 12, wherein the hook portion is a monolithic part of the central panel.

14. The method of claim 13, wherein the bolt extends through the hook portion.

15. The method of claim 9, wherein the latch includes a latch handle that extends outward from the body.

16. The method of claim 15, wherein the body has a first region of a first color and a second region of a second color, wherein the first region and the second region provide an indication of whether the latch is in a closed position or the open position when the latch handle is aligned with the first region or the second region.

* * * * *

UNITED STATES PATENT AND TRADEMARK OFFICE
CERTIFICATE OF CORRECTION

PATENT NO. : 10,625,987 B1  
APPLICATION NO. : 16/394497  
DATED : April 21, 2020  
INVENTOR(S) : Mary C. Hollowell Page 1 of 1

It is certified that error appears in the above-identified patent and that said Letters Patent is hereby corrected as shown below:

On the Title Page

Column 2, item (56), foreign patent documents, cite no. 2, delete "JP 200007272 A" and insert --JP 2000007272 A--, therefor.

Signed and Sealed this  
Twenty-sixth Day of May, 2020

Andrei Iancu  
*Director of the United States Patent and Trademark Office*